United States Patent
Jiang

(10) Patent No.: US 10,998,845 B2
(45) Date of Patent: May 4, 2021

(54) DRIVE CONTROL APPARATUS AND METHOD FOR YAW MOTOR OF WIND TURBINE

(71) Applicant: BEIJING GOLDWIND SCIENCE & CREATION WINDPOWER EQUIPMENT CO., LTD., Beijing (CN)

(72) Inventor: Yongqiang Jiang, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 431 days.

(21) Appl. No.: 15/769,005

(22) PCT Filed: Jun. 28, 2017

(86) PCT No.: PCT/CN2017/090569
§ 371 (c)(1),
(2) Date: Apr. 17, 2018

(87) PCT Pub. No.: WO2018/107721
PCT Pub. Date: Jun. 21, 2018

(65) Prior Publication Data
US 2020/0244209 A1  Jul. 30, 2020

(30) Foreign Application Priority Data
Dec. 12, 2016  (CN) .......................... 201611140888.4

(51) Int. Cl.
*H02P 29/032* (2016.01)
*H02P 29/024* (2016.01)
(Continued)

(52) U.S. Cl.
CPC .......... *H02P 29/032* (2016.02); *F03D 7/0204* (2013.01); *H02P 29/024* (2013.01); *H02P 2101/15* (2015.01)

(58) Field of Classification Search
CPC .......... H02H 7/085; H02H 7/09; H02H 3/042; H02H 7/1225; H02H 5/04; H02P 27/04;
(Continued)

(56) References Cited

U.S. PATENT DOCUMENTS 5,975,403 A * 11/1999 Ueda ...................... B23K 3/063
219/85.18
6,108,179 A * 8/2000 Katae ...................... B25J 19/06
307/139
(Continued)

FOREIGN PATENT DOCUMENTS

| CN | 201486779 U | 5/2010 |
| CN | 102602860 A | 7/2012 |

(Continued)

OTHER PUBLICATIONS

First Office Action issued by the State Intellectual Property Office of People's Republic of China for Chinese Application No. 201611140888.4, dated Aug. 2, 2018.
(Continued)

*Primary Examiner* — Bickey Dhakal
(74) *Attorney, Agent, or Firm* — Finnegan, Henderson, Farabow, Garrett & Dunner, LLP

(57) ABSTRACT

A drive control apparatus and method for a yaw motor of a wind turbine is provided. The drive control apparatus includes a frequency converter, a fault cut-out contactor, and a contactor. The frequency converter is configured to perform drive control on the yaw motor. The fault cut-out contactor is connected in series between the frequency converter and the yaw motor, and configured to be switched
(Continued)

off in a case of a fault in the frequency converter, to isolate the failed frequency converter. The contactor is connected in parallel with the frequency converter and the fault cut-out contactor, connected to the yaw motor, and configured to continue to drive the yaw motor in a case that the fault cut-out contactor is switched off. The drive control apparatus and method can solve problem of low reliability of drive control of the yaw motor.

18 Claims, 6 Drawing Sheets

(51) Int. Cl.
  *H02P 101/15* (2016.01)
  *F03D 7/02* (2006.01)
(58) Field of Classification Search
  CPC ........ H02P 5/74; H02P 29/032; H02P 29/024; H02P 2101/15; F03D 7/00; F03D 1/00; F03D 7/0204; G01R 31/08; Y02E 10/72
  See application file for complete search history.

(56) References Cited

U.S. PATENT DOCUMENTS

| | | | |
|---|---|---|---|
| 9,014,861 B2 | 4/2015 | Attia | |
| 2002/0105189 A1* | 8/2002 | Mikhail | H02P 9/007 290/44 |
| 2009/0068013 A1 | 3/2009 | Birkemose et al. | |
| 2009/0323232 A1* | 12/2009 | Suzuki | H02M 1/32 361/23 |
| 2010/0143116 A1* | 6/2010 | Zang | F03D 7/043 416/1 |
| 2010/0301604 A1* | 12/2010 | Nielsen | F03D 7/0204 290/44 |
| 2012/0081061 A1* | 4/2012 | Zargari | H02M 5/4585 318/503 |
| 2013/0235494 A1* | 9/2013 | Holce | H02P 27/047 361/31 |
| 2016/0003222 A1* | 1/2016 | Palomares Rentero | F03D 7/0204 416/1 |

FOREIGN PATENT DOCUMENTS

| | | | |
|---|---|---|---|
| CN | 102777319 A | | 11/2012 |
| CN | 202737481 U | | 2/2013 |
| CN | 104092287 A | | 10/2014 |
| CN | 104265567 A | | 1/2015 |
| CN | 105909467 A | * | 8/2016 |
| CN | 105909467 A | | 8/2016 |
| CN | 205779469 U | | 12/2016 |
| CN | 106787973 A | | 5/2017 |
| JP | 2000-175472 A | | 6/2000 |
| KR | 10-0823124 B | | 4/2008 |

OTHER PUBLICATIONS

Examination Report No. 1 issued by the Australian Government IP Office for Application No. 2017332958, dated Aug. 17, 2018.
"VFDs Can Control Multiple Motors", Kay Dekker, et al., URL:https://www.automation.com/library/articles-white-papers/motor-drives-control/vfds-can-control-multiple-motors, dated Feb. 1, 2011.
Extended European Search Report issued by European Patent Office for counterpart Application No. 17849894.5, dated Apr. 12, 2019.
International Search Report issued in International Application No. PCT/CN2017/090569, mailed from the State Intellectual Property Office of China dated Aug. 24, 2017.

* cited by examiner

DRIVE CONTROL APPARATUS AND METHOD FOR YAW MOTOR OF WIND TURBINE

The present application is the national phase of International Application No. PCT/CN2017/090569, titled "DRIVE CONTROL APPARATUS AND METHOD FOR YAW MOTOR OF WIND TURBINE", and filed on Jun. 28, 2017, which claims the priority to Chinese Patent Application No. 201611140888.4, titled "DRIVE CONTROL APPARATUS AND METHOD FOR YAW MOTOR OF WIND TURBINE", filed on Dec. 12, 2016 with the State Intellectual Property Office of the People's Republic of China, which are incorporated herein by reference in their entireties.

TECHNICAL FIELD

The present disclosure relates to the technical field of wind power, and in particular to a drive control apparatus and method for a yaw motor of a wind turbine.

BACKGROUND

A yaw system, also called a wind alignment apparatus, is a part of a nacelle of a wind turbine. The yaw system is configured for a fast and steady alignment with a wind direction in a case that a direction of a wind velocity vector varies, to cause a wind wheel to acquire maximum wind power.

FIG. 1 is a structural diagram of a circuit of a drive control apparatus for a yaw motor of a wind turbine in a conventional yaw system. Two yaw motors are taken as an example in the figure, and multiple yaw motors may be controlled based on requirements in practice. A drive control apparatus for a yaw motor of a wind turbine usually adopts the circuit structure as shown in FIG. 1. The circuit structure includes a contactor connected to the yaw motor, and a yaw motor protection switch, for example, a contactor -K1, a contactor -K2, and a motor protection switch -Q1 in the figure. In such circuit structure, common faults such as a damage of main and auxiliary contacts, a burnt coil, and a failed attraction or release of an attraction mechanism, are easy to occur. As a result, there usually will be a fault that while the drive control apparatus sends an instruction for driving the yaw motor, the yaw motor does not operate, or a fault that the yaw motor keeps operating uncontrollably and drives a yaw mechanism to rotate continuously, which further causes a cable twisted relative to the yaw mechanism to be broken.

FIG. 2 is a structural diagram of a circuit of a drive control apparatus for a yaw motor of a wind turbine in another conventional yaw system. Similar to FIG. 1, two yaw motors are taken as an example in FIG. 2, and multiple yaw motors may be controlled based on requirements in practice. Some drive control apparatuses for a yaw motor of a wind turbine adopt the circuit structure in FIG. 2. The circuit structure includes a soft starter -STR1, a contactor -K3 connected in parallel with the soft starter -STR1, and parallel-connected contactors -K1 and -K2 connected in series with the parallel-connected softer starter -STR1 and contactor -K3. The soft starter has soft start and soft stop functions for control of the yaw motor. The functions are limited, and auxiliary reversing of the contactor is needed to control a forward rotation and a reverse rotation of the yaw motor as the soft starter does not have an ability to control the forward rotation the and reverse rotation of the yaw motor. In addition, a bypass contactor is needed to cut out the soft starter after the soft starter finishes starting, so as to avoid a problem that the softer starter is easy to be damaged due to long-term operation. Therefore, a whole control system is complicated, and has more fault points than the contactor-controlling manner.

SUMMARY

A drive control apparatus and method for a yaw motor of a wind turbine is provided according to embodiments of the present disclosure, which can solve a problem of low reliability of drive control of the yaw motor of the wind turbine.

In a first aspect, a drive control apparatus for a yaw motor of a wind turbine is provided, including a frequency converter, a fault cut-out contactor, and a contactor. The frequency converter is configured to perform drive control on the yaw motor. The fault cut-out contactor is connected in series between the frequency converter and the yaw motor, and is configured to be switched off in a case that a fault occurs in the frequency converter, to isolate the failed frequency converter. The contactor is connected in parallel with the frequency converter and the fault cut-out contactor, and connected to the yaw motor, and is configured to continue to drive the yaw motor after the fault cut-out contactor is switched off. The number of the yaw motor is at least two.

In a second aspect, a drive control method for a yaw motor of a wind turbine is provided, including: monitoring a fault situation of a frequency converter; in a case that a fault in the frequency converter is monitored, controlling a fault cut-out contactor to be switched off to isolate the failed frequency converter, or sending a stop instruction directly to the frequency converter to cause the frequency converter to stop operating; and sending a control instruction to a contactor, to continue to perform drive control, via the contactor, on the yaw motor after the frequency converter stops operating.

In the drive control apparatus and method for the yaw motor of the wind turbine according to the embodiments of the present disclosure, drive control is performed on the yaw motor of the wind turbine via the frequency converter and the contactor, improving redundancy and reliability of the drive control of the yaw motor of the wind turbine.

BRIEF DESCRIPTION OF THE DRAWINGS

In order to illustrate technical solutions in embodiments of the present disclosure more clearly, drawings used in the description of the embodiments are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF THE EMBODIMENTS

Figure 1:
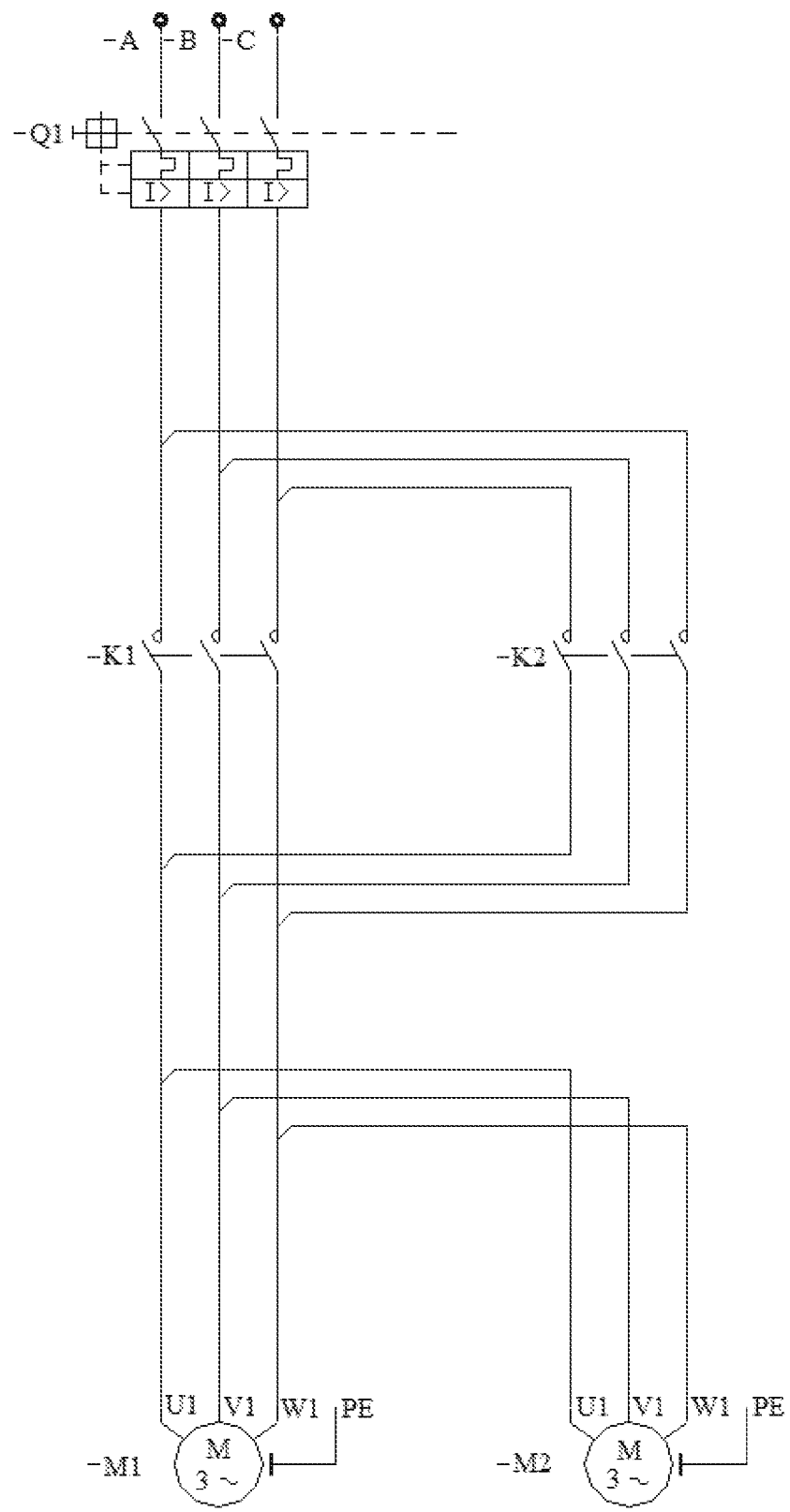
FIG. 1 is a structural diagram of a circuit of a drive control apparatus for a yaw motor of a wind turbine in a conventional yaw system.

For a better understanding of the object, technical solutions and advantages of embodiments of the present disclosure, the technical solutions in embodiments of the present disclosure are described clearly and completely hereinafter in conjunction with the drawings of the embodiments of the present disclosure. Apparently, the embodiments described herein are only a few rather than all of the embodiments of the invention. All other embodiments obtained based on the embodiments of the present disclosure by those skilled in the art without any creative efforts fall within the protection scope of the present disclosure.

Features and exemplary embodiments of the various aspects of the present disclosure are described in detail hereinafter. In the following detailed description, numerous specific details are set forth to provide a thorough understanding of the present invention. However, it will be apparent to those skilled in the art that the present invention may be implemented without some of the specific details. The following description of the embodiments is merely for providing a better understanding of the present invention by showing examples of the present invention. The invention is not limited to any of the specific configurations and algorithms set forth hereinafter, but covers any modification, substitution and improvement of elements, components and algorithms without departing from the spirit of the invention. In the drawings and the following description, well-known structures and techniques are not shown, to avoid unnecessarily obscuring of the present invention.

Exemplary embodiments are described in detail with reference to the drawings. However, exemplary embodiments may be implemented in various forms and should not be construed as limited to the embodiments described herein. Instead, the embodiments are provided to make the present disclosure to be more thorough and complete, and to fully convey concepts of the exemplary embodiments to those skilled in the art. In the drawings, thickness of regions and layers may be exaggerated for clarity. The same reference numbers in the drawings denote the same or similar structures, and thus their detailed description will be omitted.

Furthermore, the described features, structures, or features may be combined in any suitable manner in one or more embodiments. In the following description, numerous specific details are set forth to provide a thorough understanding of embodiments of the present disclosure. However, those skilled in the art will recognize that technical solutions of the present invention may be implemented without one or more of the specific details, or, that other methods, components or materials may be adopted. In other instances, well-known structures, materials, or operations are not shown or described in detail to avoid obscuring of primary technical innovation of the present invention.

It should be noted that in the case of no conflict, the embodiments of the present disclosure and the features in the embodiments may be combined with each other. The invention are described in detail hereinafter with reference to the drawings and the embodiments.

Figure 2:
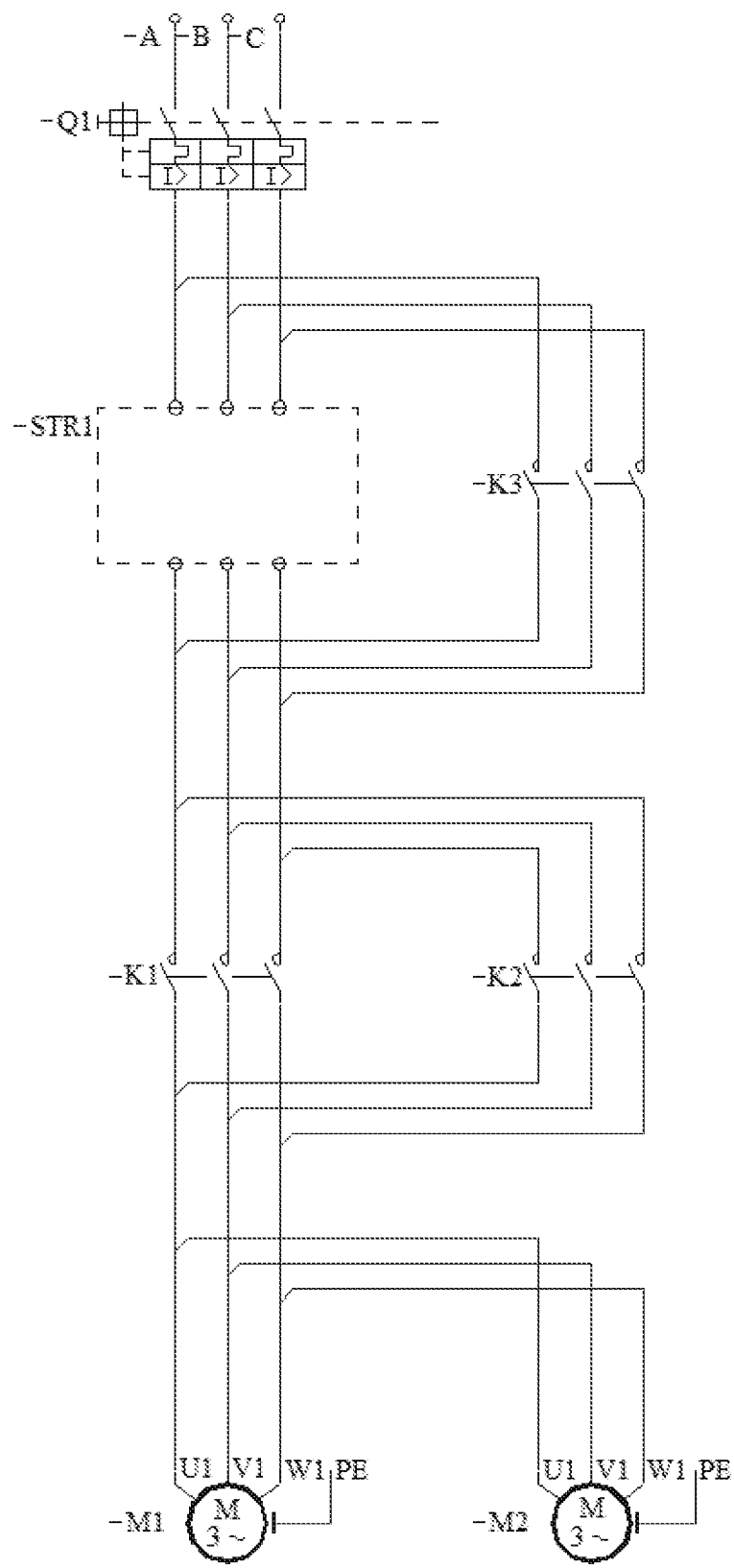
FIG. 2 is a structural diagram of a circuit of a drive control apparatus for a yaw motor of a wind turbine in another conventional yaw system.
Figure 3:
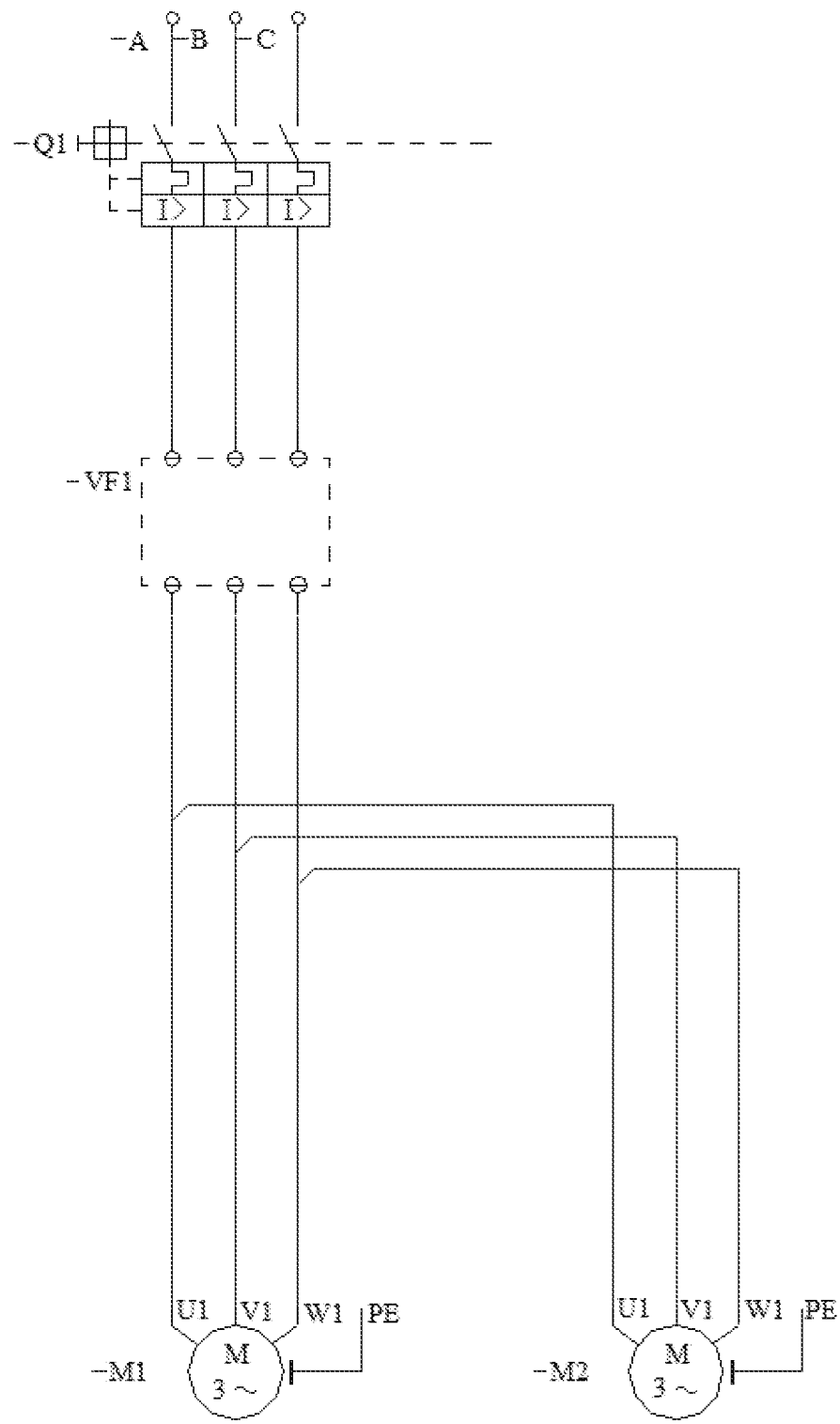
FIG. 3 is a structural diagram of a circuit of a drive control apparatus for a yaw motor of a wind turbine in a relatively new yaw system.

Compared with two kinds of drive control apparatuses for a yaw motor of a wind turbine shown in FIG. 1 and FIG. 2, FIG. 3 is a structural diagram of a circuit of a relatively new drive control apparatus for a yaw motor of a wind turbine. As shown in FIG. 3, the drive control apparatus for the yaw motor of the wind turbine includes a frequency converter -VF1 and a yaw motor protection switch -Q1, which are sequentially connected to the yaw motor, where the frequency converter -VF1 controls the yaw motor of the wind turbine independently. Such circuit structure avoids a limitation that a fault is easy to occur in a contactor-type control device. However, system redundancy is not sufficient, and a yaw function of the wind turbine will fail in a case of a fault in the frequency converter.

It can be seen that, conventional control manners of the yaw motor of the wind turbine usually have drawbacks such as low system reliability, incomplete protection function, shallow function development of frequency converter, unreasonable configuration of control parameters, and inadequate yaw functions. Due to the low reliability and the inadequate protection function of the conventional drive control apparatus for the yaw motor of the wind turbine, once a fault occurs in the drive control apparatus, there will be problems ranging from a machine halt and a loss of power generation, to a burnt yaw motor and a broken cable. In situations requiring high reliability, such as offshore wind turbine, once such faults occur, there will be a great increase in power loss and maintenance cost. In addition, in a case that a fault occurs in the drive control apparatus for the yaw motor of the wind turbine under typhoon, a yaw instruction to take shelter from wind for safety can not be performed, resulting in more serious damage to the wind turbine.

In view that the drive control apparatuses for the yaw motor of the wind turbine shown in FIG. 1 to FIG. 3 have one or more drawbacks mentioned above, a drive control apparatus and method for a yaw motor of a wind turbine is provided according to embodiments of the present disclosure.

Figure 4:
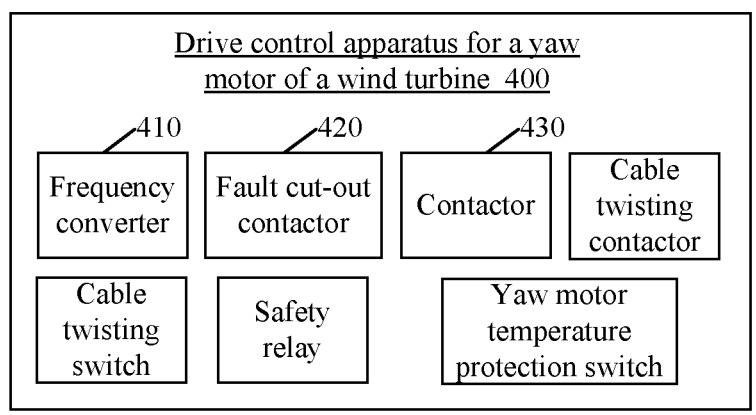
FIG. 4 is a block diagram of a drive control apparatus for a yaw motor of a wind turbine according to an embodiment of the present disclosure.

FIG. 4 is a block diagram of a drive control apparatus for a yaw motor of a wind turbine according to an embodiment of the present disclosure. As shown in FIG. 4, the drive control apparatus 400 for the yaw motor of the wind turbine includes a frequency converter 410, a fault cut-out contactor 420, and a contactor 430. The frequency converter 410 is configured to perform drive control on the yaw motor. The fault cut-out contactor 420 is connected in series between the frequency converter 410 and the yaw motor, and is configured to be switched off in a case that a fault occurs in the frequency converter 410, to isolate the failed frequency converter 410 from the yaw motor. The contactor 430 is connected in parallel with the frequency converter 410 and the fault cut-out contactor 420, and connected to the yaw motor, and is configured to continue to drive the yaw motor after the fault cut-out contactor 420 is switched off. By applying the frequency converter 410 and the contactor 430 to perform drive control on the yaw motor of the wind turbine, redundancy and reliability of drive control of the yaw motor of the wind turbine are improved.

Figure 5:
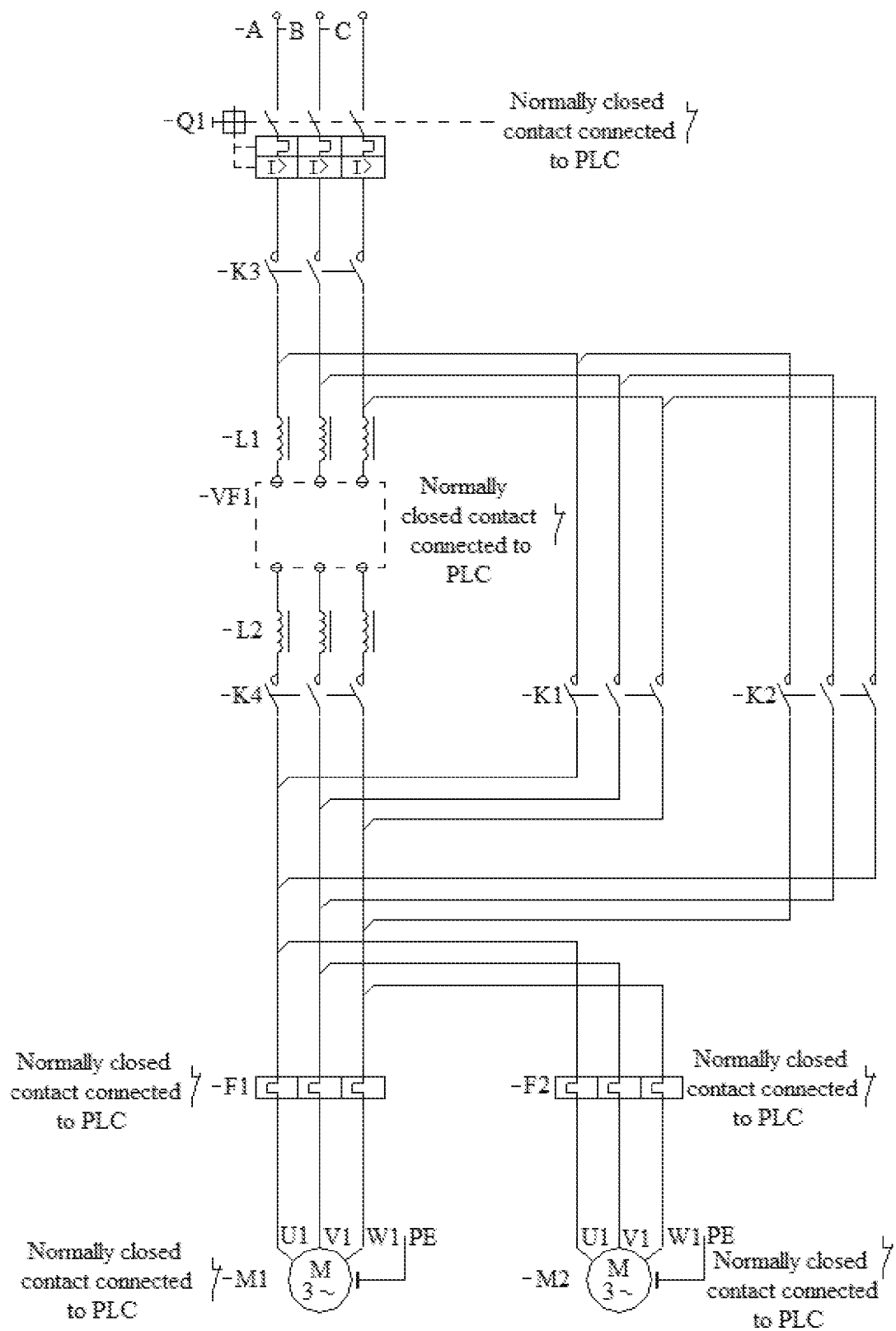
FIG. 5 is a structural diagram of a circuit of a drive control apparatus for a yaw motor of a wind turbine according to an embodiment of the present disclosure.

FIG. 5 is a structural diagram of a circuit of a drive control apparatus for a yaw motor of a wind turbine according to an embodiment of the present disclosure. As shown in FIG. 5, the drive control apparatus for the yaw motor of the wind turbine includes a fault cut-out contactor -K4 and a frequency converter -VF1 which are sequentially connected in series with yaw motors -M1 and -M2, and includes contactors -K1 and -K2 which are connected in parallel with the series-connected fault cut-out contactor -K4 and frequency converter -VF1.

It should be noted that FIG. 5 only shows a situation of two yaw motors, and three, four or more yaw motors may be included in different wind turbines. However, adding of yaw motors does not require more contactors to control the yaw motors, and still two contactors -K1 and -K2 are needed to control a forward rotation and a reverse rotation of the yaw motors, respectively.

In a case that a fault occurs in the frequency converter -VF1, the failed frequency converter -VF1 is isolated via the fault cut-out contactor -K4. That is, the frequency converter -VF1 is isolated from the yaw motors -M1 and -M2, and the contactors K1 and K2 are used to control the forward rotation and the reverse rotation of the yaw motors -M1 and -M2, respectively.

In some examples, the frequency converter -VF1 may include a normally closed contact. In a case of a fault occurs in the frequency converter -VF1, the normally closed contact switches from a close state to an open state. A close/open state signal of the normally closed contact of the frequency converter -VF1 is sent to a controller of the control apparatus of the yaw motor of the wind turbine. The controller is, for example, a PLC, may serve as an auxiliary controller arranged in a main control system of the wind turbine, and also may be arranged separately from the main control system and keep communication with the main control system. Specifically, in a case that the normally closed contact of the frequency converter -VF1 is in the close state (i.e., the frequency converter -VF1 operates normally), the frequency converter -VF1 receives an instruction of forward rotation, reverse rotation instruction or stop, from the controller, and then controls the yaw motors -M1 and -M2 to rotate forward, rotate reversely, or stop. In a case that the normally closed contact of the frequency converter -VF1 switches from the close state to the open state (i.e., a fault occurs in the frequency converter -VF1), the forward rotation and the reverse rotation of the yaw motors -M1 and -M2 are respectively controlled by the contactors K1 and K2, and the contactors K1 and K2 receive an instruction of drive or stop from the controller, and then control the yaw motors to rotate forward, rotate reversely, or stop. Since the contactors K and K2 are spare control elements of the yaw motors -M1 and -M2, redundancy of the drive control of the yaw motor of the wind turbine is improved.

In some examples, the drive control apparatus for the yaw motor of the wind turbine according to the embodiment of the present disclosure may further include reactors arranged at two terminals of the frequency converter. For example, reactors L1 and L2 are respectively arranged at incoming line and outgoing line locations of the frequency converter -VF1, and are configured to protect the frequency converter -VF1, the yaw motors and a cable. Due to the addition of the reactors L1 and L2 at the two terminals of the frequency converter -VF1 and the fault cut-out contactor K4, the drive control apparatus for the yaw motor of the wind turbine can effectively prevent a fault in the frequency converter caused by poor quality of an incoming power supply, an impact damage from the frequency converter on the cable and the yaw motor, and a situation that the frequency converter is burnt due to an inverse power transmission of an output terminal of the frequency converter.

In some examples, the drive control apparatus for the yaw motor of the wind turbine according to the embodiment of the present disclosure may further include a cable twisting contactor. The cable twisting contactor is connected in series between a power supply and a parallel-connection node of the contactor and the frequency converter, and is configured to stop or trip in a case that a fault occurs in the drive control apparatus or the yaw motor. For example, the cable twisting contactor -K3 is arranged at an upstream location of the frequency converter -VF1 and the contactors K1 and K2, which is close to a power supply entrance -A-B-C, and may serve as a redundant control device of a dynamic control circuit of the yaw motors -M1 and -M2. In a case that the control circuit of the yaw motors of the frequency converter -VF1 and the contactors K1 and K2 is out of control, the cable twisting contactor can cut off all power supplies of the yaw motors, including a fault point out of control.

In some examples, the drive control apparatus for the yaw motor of the wind turbine according to the embodiment of the present disclosure may further include a cable twisting switch. The cable twisting switch is connected to the cable twisting contactor. The cable twisting switch is configured to detect an extreme location of yawing of the yaw motor, and send, in a case that it is detected that the yaw motor yaws to the extreme location, a fault signal to the cable twisting contactor to trigger the cable twisting contactor to stop or trip.

In some examples, the cable twisting switch may be arranged in a cam structure formed by a yaw gear ring, to cause a cam to trigger the cable twisting switch in a case that the yaw motor yaws to the extreme location. For example, the cable twisting switch may be a sensor detecting the extreme location of the yawing of the yaw motor, and may be arranged near a large yaw gear ring. A set of transmission mechanism is driven via a small gear engaged with the large yaw gear ring, to conduct a yaw motion into a cam motion that can trigger switching action of an inner contact of the cable twisting switch. A rotational angle of the cam is tuned, to cause the cam to trigger the switching action of the inner contact of the cable twisting switch in a case that the yawing of the yaw motor is at the extreme location.

In some examples, the cable twisting switch may adopt a multi-contact trigger structure, and may be provided with normally closed contacts. The cable twisting switch sends, in a case that any contact of the cable twisting switch is open, a fault signal to the cable twisting contactor to trigger the cable twisting contactor to stop or trip. For example, to ensure that the cable twisting switch outputs the fault signal reliably, the cable twisting switch may apply a double-contact structure, and the contacts may be normally closed contacts, so as to prevent problems of line disconnection and virtual connection.

In some examples, the drive control apparatus for the yaw motor of the wind turbine according to the embodiment of the present disclosure may further include a safety relay. The safety relay is connected in series between the cable twisting switch and the cable twisting contactor, and is configured to stop or trip, after receiving the fault signal sent by the cable twisting switch, to disconnect a power supply circuit of the cable twisting contactor, so as to trigger the cable twisting contactor to stop or trip. For example, a close/open state signal of the cable twisting switch may be transmitted to the safety relay. In a case that any normally closed contact of the cable twisting switch switches from the close state to the open state, it is represented that the yaw motor is at the extreme location, and the safety relay may perform a stop or trip action and disconnect the power supply circuit of the cable twisting contactor, to cause the cable twisting contactor to stop or trip, thereby protecting the cable twisted by a yaw mechanism.

In some examples, the drive control apparatus for the yaw motor of the wind turbine according to the embodiment of the present disclosure may send an extreme yawing warning to an operator and remind a maintainer to check and repair a fault of uncontrolled yaw, after the cable twisting contactor stops or trips.

In some examples, the drive control apparatus for the yaw motor of the wind turbine according to the embodiment of the present disclosure may further include a thermal relay. The thermal relay is connected in series with the yaw motor, and is configured to be switched off, in a case that a fault of overload or missing phase occurs in the yaw motor, and send a fault signal. That is, the thermal relay has functions of overload protection and missing phase protection for the yaw motor. For example, thermal relays -F1 and -F2 in FIG. 5 may include normally closed contacts, where the normally closed contacts switch from a close state to an open state in a case that the thermal relays -F1 and -F2 detect overload or missing phase of the yaw motor. In an example, a close/open state signal of the normally closed contacts of the thermal relays -F1 and -F2 may be uploaded to the controller. In a case that the normally closed contacts of the thermal relay -F1 and -F2 switches from the close state to the opens state, it is represented that there is a fault of overload or missing phase in the connected yaw motor -M1 or -M2, and the controller may send a stop or trip instruction to the -VF1 or the contactors K1 and K2, so as to protect the yaw motor. For example, the controller may further send a fault warning of overload or missing phase in the yaw motor to an operator after sending the stop or trip instruction to the frequency converter or the contactors, and remind a maintainer to check and repair the yaw motor.

In some examples, windings of the yaw motor may be connected to the drive control apparatus of the yaw motor in star connection or delta connection. For example, the windings of the yaw motor may be connected to the drive control apparatus of the yaw motor in star connection, so that the thermal relay provides more reliable overload protection and missing phase protection.

In some examples, the drive control apparatus for the yaw motor of the wind turbine according to the embodiment of the present disclosure may further include a yaw motor protection switch. The yaw motor protection switch is configured to detect a current in a control circuit of the yaw motor, and configured to be switched off in a case that anomaly of the detected current occurs, and send a fault signal. For example, in FIG. 5, the yaw motor protection switch Q1 is arranged at a top of a main incoming line, and has functions of overload protection and overcurrent protection.

In some examples, the yaw motor protection switch Q1 may include a normally closed contact. The normally closed contact switches from a close state to an open state, in a case that the yaw motor protection switch Q1 trips due to detection of an overcurrent (for example, a situation of a rapid increasing current caused by a short circuit) or an overload in a main circuit. For example, a close/open state signal of the yaw motor protection switch Q1 may be uploaded to the controller. In a case that the yaw motor protection switch switches from the close state to the open state, it is represented that there is a fault of short circuit or overload in a main circuit between the yaw motor protection switch Q1 and the yaw motors -M1 and -M2, and the controller may send a fault warning to an operator that the yaw motor protection switch Q1 trips, and remind a maintainer to check and repair the main circuit.

In some examples, the drive control apparatus for the yaw motor of the wind turbine according to the embodiment of the present disclosure may further include a yaw motor temperature protection switch. The yaw motor temperature protection switch is configured to detect a winding temperature of the yaw motor, and send a fault signal in a case that the detected winding temperature of the yaw motor is greater than a preset temperature. In some embodiments, the yaw motor temperature protection switch may be arranged in the yaw motor. The yaw motor temperature protection switch may include a normally closed contact, and the normally closed contact switches from a closed state to an open state in a case that the yaw motor temperature protection switch detects that the winding temperature of the yaw motor exceeds limitation. A close/open signal of the normally closed contact of the yaw motor temperature protection switch may be sent to the controller. In a case that the normally closed contact of the yaw motor temperature protection switch switches from the close state to the open state, it is represented that the winding temperature of the yaw motor exceeds the limitation, and the controller may send a stop or trip instruction to the frequency converter or the contactor, so as to protect the yaw motor. For example, the controller may further send a warning of high winding temperature of the yaw motor to an operator, and remind a maintainer to check and repair the yaw motor.

Figure 6:
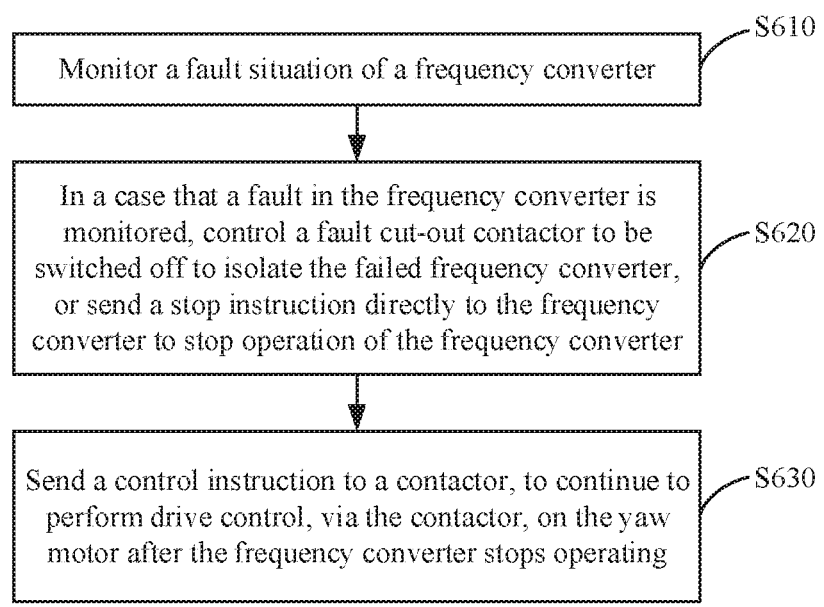
FIG. 6 is a flow chart of a drive control method for a yaw motor of a wind turbine according to an embodiment of the present disclosure.

FIG. 6 is a flow chart of a drive control method for a yaw motor of a wind turbine according to an embodiment of the present disclosure. The drive control method for the yaw motor of the wind turbine is applied to the controller of the above drive control apparatus for the yaw motor of the wind turbine.

As shown in FIG. 6, the drive control method for the yaw motor of the wind turbine according to the embodiment of the present disclosure may include steps S610 to S630. In S610, a fault situation of a frequency converter is monitored. In S620, in a case that a fault in the frequency converter is monitored, a fault cut-out contactor is controlled to be switched off to isolate the failed frequency converter from the yaw motor, or a stop instruction is directly sent to the frequency converter to cause the frequency converter to stop operating. In S630, a control instruction is sent to a contactor, to continue to perform drive control, via the contactor, on the yaw motor after the frequency converter stops operating.

For example, in a case that a normally closed contact of the frequency converter switches from a close state to an open state, it is represented that there is a fault in the frequency converter, the fault cut-out contactor may be controlled to be switched off to isolate the failed frequency converter from the yaw motor, and an instruction of forward rotation, reverse rotation or stop may be sent to the frequency converter, to control the yaw motor to rotate forward, rotate reversely, or stop. In a case that a fault occurs in the frequency converter, the forward rotation and the reverse rotation of the yaw motor are respectively controlled by the contactor, and the contactor receives a drive or stop instruction to control the yaw motor to rotate forward, rotate reversely, or stop. Since the contactor can continue to control the yaw motor in a case of a fault in the frequency converter, redundancy of drive control of the yaw motor of the wind turbine is improved.

In some examples, the drive control method for the yaw motor of the wind turbine according to the embodiment of the present disclosure may further include: detecting a fault situation of the yaw motor, and controlling a cable twisting contactor to stop or trip in a case that a fault occurs in the drive control apparatus or the yaw motor.

In some examples, the drive control method for the yaw motor of the wind turbine according to an embodiment of the present disclosure may further include: detecting a yaw time of the yaw motor, and determining that there is a fault in the yaw motor in a case that the yaw time is greater than a preset value. For example, the preset value may be set based on a maximum permitted yaw time. Timing starts as the drive control of the yaw motor is started, and the cable twisting contactor is controlled to stop or trip in a case of detection of time out of a yaw action, so as to protect a cable twisted by a yaw mechanism.

In some examples, the drive control method for the yaw motor of the wind turbine according to the embodiment of the present disclosure may further include: receiving a fault signal sent by a thermal relay and/or a yaw motor temperature protection switch; and sending a stop operation signal to the frequency converter or the contactor to cause the yaw motor to stop operation, in a case that the fault signal sent by the thermal relay and/or the yaw motor temperature protection switch is received.

In some examples, the drive control method for the yaw motor of the wind turbine according to the embodiment of the present disclosure may further include: receiving a fault signal sent by a yaw motor protection switch. In some embodiments, the drive control method for the yaw motor of the wind turbine according to the embodiment of the present disclosure may further include: sending a warning signal, in a case that it is determined that there is a fault in the yaw motor or the drive control apparatus. For example, a warning of yaw time out may be further sent to an operator, to remind a maintainer to check and repair a fault of yaw time out.

In some examples, the drive control method for the yaw motor of the wind turbine according to the embodiment of the present disclosure may further include: receiving one or more signals of the wind turbine: a tower-top load signal, a whole body vibration signal, and a yaw mechanical noise signal; and comparing the one or more signals respectively with a preset value, and regulating a rotational speed of the yaw motor based on a comparison result. For example, output of a rotational speed of the frequency converter is set to be three levels, which are a high speed, a normal speed, and a low speed, respectively, and thus a yaw speed is regulated to meet a current load requirement.

In some examples, the drive control method for the yaw motor of the wind turbine according to the embodiment of the present disclosure may further include: receiving a current signal outputted by a tower-top load sensor, a whole body vibration sensor, or a yaw mechanical noise sensor. Multiple predetermined values, such as a large value, a normal value and a small value, may be set for each signal. For example, in a case that a characteristic quantity, such as a current value, corresponding to any signal is greater than a predetermined value denoting the large value, a control instruction may be sent to the yaw motor, and the yaw motor is controlled to operate at a low speed via the frequency converter, where the specific speed may be determined by wind turbine load simulation software. In a case that current values corresponding to all the signals are smaller than a predetermined value denoting the small value, a control instruction may be sent to the yaw motor, and the yaw motor is controlled to operate at a high speed. For example, the high speed is a high speed permitted by safe operation of the wind turbine. In a case that the current values corresponding to all the signals are between the predetermined value denoting the large value and the predetermined value denoting the small value, a control instruction may be sent to the yaw motor, and the yaw motor is controlled to operate at a normal speed. Generally, the signals outputted by the tower-top load sensor, the whole body vibration sensor, and the yaw mechanical noise sensor are different, and the signals may be represented by a same characteristic quantity, such as a current value or a voltage value. With the above drive control method, functions and utilization rate of the frequency converter are increased, and yaw control functions are also enriched, avoiding waste of frequency converter resources.

Those skilled in the art can appreciate that units and algorithm steps of each example described in conjunction with the embodiments disclosed herein may be implemented by electronic hardware, computer software, or a combination of the two. To clearly describe interchangeability of hardware and software, composition and steps of the each example are generally described in terms of functions in the above description. Whether the functions are implemented by hardware or software depends on specific application and design constraints of technical solutions. Those skilled in the art may adopts a different method to the described functions for each particular application, and such implementation should not be considered as beyond the scope of the present invention.

It should be understood that the disclosed system, device and method according to the embodiments of the present disclosure may be implemented in other ways. For example, the device embodiments described above are illustrative only. For example, the units are divided merely in logical function, which may be divided in another way in actual implementation. For example, multiple units or components may be combined or integrated into another system, or some features may be ignored or not performed. In addition, the disclosed or discussed mutual coupling or direct coupling or communication connection may be an indirect coupling or communication connection through some interfaces, devices or units, which may be implemented in electronic, mechanical or other forms.

The foregoing descriptions are merely embodiments of the invention, and the protection scope of the invention is not limited thereto. Variations or substitutions made by those skilled in the art without departing from the technical scope of the present disclosure shall fall within the protection scope of the invention. Therefore, the protection scope of the invention shall be defined by the appended claims.

The invention claimed is:

1. A drive control apparatus for a yaw motor of a wind turbine, comprising:
   a frequency converter, configured to perform drive control on the yaw motor;
   a fault cut-out contactor, connected in series between the frequency converter and the yaw motor, and configured to be switched off in a case that a fault occurs in the frequency converter to isolate the failed frequency converter;
   a contactor, connected in parallel with the frequency converter and the fault cut-out contactor, connected to the yaw motor, and configured to continue to drive the yaw motor after the fault cut-out contactor is switched off; and
   a cable twisting contactor, connected in series between a power supply and a parallel-connection node of the contactor and the frequency converter, and configured to stop or trip in a case that a fault occurs in the drive control apparatus or the yaw motor;
   wherein the number of the yaw motor is at least two.

2. The drive control apparatus for the yaw motor of the wind turbine according to claim 1, further comprising a cable twisting switch, wherein the cable twisting switch is connected to the cable twisting contactor, and is configured to detect an extreme location of yawing of the yaw motor, and send, in a case that it is detected that the yaw motor yaws to the extreme location, a fault signal to the cable twisting contactor to trigger the cable twisting contactor to stop or trip.

3. The drive control apparatus for the yaw motor of the wind turbine according to claim 2, wherein the cable twisting switch is arranged in a cam structure formed by a yaw gear ring, to cause a cam to trigger the cable twisting switch in a case that the yaw motor yaws to the extreme location.

4. The drive control apparatus for the yaw motor of the wind turbine according to claim 3, wherein the cable twisting switch adopts a multi-contact trigger structure and is provided with normally closed contacts, and the cable twisting switch sends, in a case that any contact of the cable twisting switch is open, a fault signal to the cable twisting contactor to trigger the cable twisting contactor to stop or trip.

5. The drive control apparatus for the yaw motor of the wind turbine according to claim 4, further comprising a safety relay, wherein the safety relay is connected in series between the cable twisting switch and the cable twisting contactor, and is configured to stop or trip, after receiving the fault signal sent by the cable twisting switch, to disconnect a power supply circuit of the cable twisting contactor, so as to trigger the cable twisting contactor to stop or trip.

6. The drive control apparatus for the yaw motor of the wind turbine according to claim 3, further comprising a safety relay, wherein the safety relay is connected in series between the cable twisting switch and the cable twisting contactor, and is configured to stop or trip, after receiving the fault signal sent by the cable twisting switch, to disconnect a power supply circuit of the cable twisting contactor, so as to trigger the cable twisting contactor to stop or trip.

7. The drive control apparatus for the yaw motor of the wind turbine according to claim 2, further comprising a safety relay, wherein the safety relay is connected in series between the cable twisting switch and the cable twisting contactor, and is configured to stop or trip, after receiving the fault signal sent by the cable twisting switch, to disconnect a power supply circuit of the cable twisting contactor, so as to trigger the cable twisting contactor to stop or trip.

8. The drive control apparatus for the yaw motor of the wind turbine according to claim 1, further comprising a safety relay, wherein the safety relay is connected in series between the cable twisting switch and the cable twisting contactor, and is configured to stop or trip, after receiving the fault signal sent by the cable twisting switch, to disconnect a power supply circuit of the cable twisting contactor, so as to trigger the cable twisting contactor to stop or trip.

9. The drive control apparatus for the yaw motor of the wind turbine according to claim 1, further comprising a thermal relay, wherein the thermal relay is connected in series with the yaw motor, and is configured to be switched off, in a case that a fault of overload or missing phase occurs in the yaw motor, and send a fault signal.

10. The drive control apparatus for the yaw motor of the wind turbine according to claim 1, further comprising a yaw motor protection switch, wherein the yaw motor protection switch is configured to detect a current in a control circuit of the yaw motor, and configured to be switched off in a case that anomaly of the detected current occurs, and send a fault signal.

11. The drive control apparatus for the yaw motor of the wind turbine according to claim 1, further comprising a yaw motor temperature protection switch, configured to detect a winding temperature of the yaw motor, and send a fault signal in a case that the detected winding temperature of the yaw motor is greater than a preset temperature.

12. The drive control apparatus for the yaw motor of the wind turbine according to claim 1, further comprising reactors arranged at two terminals of the frequency converter.

13. A method performed by the drive control apparatus according to claim 1, the method comprising:
monitoring a fault situation of the frequency converter;
controlling the fault cut-out contactor to be switched off to isolate the failed frequency converter or sending a stop instruction directly to the frequency converter to cause the frequency converter to stop operating, in a case that a fault in the frequency converter is monitored; and
sending a control instruction to the contactor, to continue to perform drive control, via the contactor, on the yaw motor after the frequency converter stops operating.

14. The drive control method for the yaw motor of the wind turbine according to claim 13, further comprising:
detecting a fault situation of the yaw motor, and controlling the cable twisting contactor to stop or trip in a case that a fault occurs in the drive control apparatus or the yaw motor.

15. The drive control method for the yaw motor of the wind turbine according to claim 14, wherein detecting the fault situation of the yaw motor, and controlling the cable twisting contactor to stop or trip in a case that a fault occurs in the drive control apparatus or the yaw motor further comprises:
detecting a yaw time of the yaw motor, and determining that a fault occurs in the yaw motor in a case that the yaw time is greater than a preset value, wherein detecting the yaw time comprises detecting a time duration in which drive control is performed on the yaw motor.

16. The drive control method for the yaw motor of the wind turbine according to claim 13, further comprising:
receiving a fault signal sent by a thermal relay and/or a yaw motor temperature protection switch; and
sending a stop operation signal to the frequency converter or the contactor to cause the yaw motor to stop operation, in a case that the fault signal sent by the thermal relay and/or the yaw motor temperature protection switch is received.

17. The drive control method for the yaw motor of the wind turbine according to claim 13, further comprising:
receiving a fault signal sent by a yaw motor protection switch.

18. The drive control method for the yaw motor of the wind turbine according to claim 13, further comprising:
receiving one or more signals of the wind turbine: a tower-top load signal, a whole body vibration signal, and a yaw mechanical noise signal; and
comparing the one or more signals respectively with a preset value, and regulating a rotational speed of the yaw motor based on a comparison result.

* * * * *